Patented Mar. 28, 1944

UNITED STATES PATENT OFFICE 2,345,216

CYCLOPENTANOPOLYHYDROPHENANTHRENE HYDROXY ALDEHYDES AND ESTERS THEREOF

Tadeus Reichstein, Basel, Switzerland, assignor to the firm of Roche-Organon Incorporated, Nutley, N. J.

No Drawing. Application May 16, 1941, Serial No. 393,831. In Switzerland June 17, 1940

5 Claims. (Cl. 260—397.4)

This invention relates generally to compositions of matter useful in therapy and more particularly to novel compounds of this type of the cyclopentanopolyhydrophenanthrene series, together with methods of preparing the same.

The invention is based on the observation that hydroxy-aldehydes of the cyclopentanopolyhydrophenanthrene series together with corresponding esters thereof, can be prepared from saturated or unsaturated compounds of this series having a 17-position substituent of the general form:

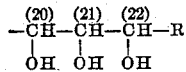

wherein R represents a substituent selected from the class comprising hydrogen and hydrocarbon radicals.

The hydroxy-aldehydes are prepared from these materials by condensing the hydroxyl groups at the 21 and 22 positions with a suitable reactive carbonyl compound in the presence of a dehydrating agent, esterifying the hydroxyl group at the 20 position, thereafter reforming the hydroxyl groups at the 21 and 22 positions by reaction with an acidic reagent, converting the product to a corresponding ester of the hydroxy-aldehyde, and saponifying the same to yield the hydroxy-aldehyde.

The 20-21-22-trihydroxy compounds above mentioned used as raw materials in the novel process according to this invention can be prepared by known methods, for instance, by reaction of the magnesium halides of the propenols and their homologs with steroids substituted in the 17-position by a keto-oxygen group, followed by splitting off of water and hydroxylation. The compounds may contain nuclear substituents in addition to the group occupying the 17-position above described, for example, alkoxyl, acyloxy, hydroxyl or keto groups may be present in any of the positions in which they occur in steroids, and the compounds used may be a single or a mixture of several of the possible stereo isomers. For example, among the substances which have been found suitable for the purposes of this invention are 17-trihydroxypropyltestosterone, 17-trihydroxypropylandrostene-3-one; 17-t r i h y - droxypropylandrostene-11-ol-3-one; 17-trihydroxypropylandrostene-3, 17-diol; 17-trihydroxypropylandrostene-3-ol; 17-trihydroxypropylandrostene-3-one; 17-trihydroxypropyl dihydrostetosterone, and derivatives thereof.

In practicing the present invention, the above mentioned raw materials are initially treated with a reagent having a reactive carbonyl group such as acetone, methyl-ethyl ketone, cyclohexanone or benzaldehyde, in the presence of a suitable dehydrating agent, for example, anhydrous acids or salts such as copper sulphate, sodium sulphate, zinc chloride or the like. By this reaction the hydroxyl groups of the 17-position substituent, occupying the positions of the side chain which are most remote from the nucleus are protected by conversion into corresponding derivatives such as ketonides, and esterification of the third hydroxyl group on the side chain can thereafter occur by employment of the usual method. In the presence of basic reagents, this last reaction occurs as an ancillary reaction to that first above described. In general, aliphatic, hydroaromatic or aromatic carboxylic acid groups, or sulphonic acid groups can be introduced in this manner as substituents by appropriate selection of reagent. Specifically, the reaction has been found suitable for introducing, as substituents, the radicals derived from formic, acetic, propionic, butyric, benzoic, and toluol-sulphonic acid.

After esterification of the unprotected side chain hydroxyl group as above described, the protecting carbonyl compound previously introduced is removed by a suitable reagent such as an organic or inorganic acid, for example acetic, sulphuric or the halogen acids, thus restoring the hydroxyl groups to the positions 21 and 22. Unexpectedly, the regeneration of these hydroxyl groups can be conducted in such a manner that the substituent of the third hydroxyl group does not migrate or shift in location as is common in the carbohydrate series, even though the substituent group corresponds to one of the lower aliphatic acids.

The partially esterified polyhydroxy derivative so obtained is thereafter reacted with a suitable reagent, for instance, lead tetraacylates or periodic acid, to convert the same into the corresponding aldehyde, thus yielding an ester of one of the saturated or unsaturated pregnane-20-ol-21-als. The compounds so produced can be transformed by hydrolysis, using for example alkali bicarbonate solutions or equivalent reagents, into the corresponding α-hydroxy-aldehydes.

By practicing the hereinabove described process, compounds of the cyclopentanopolyhydrophenanthrene series are obtained having a 17-position substituent of the form —CHR—CHO, wherein R is a free or esterified, for example acylated, hydroxyl group, like the saturated and unsaturated pregnane-3-one-20-ol-21-als, pregnane-3,20-diol-21-als and their esters or ethers together with analogous compounds additionally substituted at the eleventh, twelfth or seventeenth positions by hydroxyl or keto-oxygen groups. The products so obtained are highly active derivatives of the adrenal cortical hormone type or can be transformed into the same.

In order to promote a better understanding the novel method of preparing hydroxyaldehydes of the cyclopentanopolyhydrophenanthrene series and their esters according to the present invention, a specific procedure will be hereinafter described, illustrating the details of the process as applied to the preparation of typical compounds. It is clearly to be understood however that this specific procedure, while illustrative of the preferred practice of the invention, is not intended to constitute a limitation thereon.

About two parts by weight of a trihydroxypropyl-17-androstenol-17-one-3, which can be obtained by removing a molecule of water from allyl-17-androstenol-17-one-3 followed by hydroxylation with osmium tetroxide, are dissolved in approximately 4,000 parts by weight of acetone and mechanically agitated for about 15 hours with about 30 parts by weight of anhydrous copper sulphate. Thereafter the mixture is filtered, the residue washed with acetone, and the filtrate shaken for about 10 minutes with divided potassium carbonate and again filtered. The filtrate so obtained is then evaporated and the residue dissolved in absolute ether to produce a solution which, after being filtered, is concentrated by evaporation causing deposit of the dissolved material. By recrystallization of the material from ether, approximately 1.85 parts by weight of the mono-acetone derivative of trihydroxypropyl-17-androstenol-17-one-3 (M. P. 220–235° C.) are obtained. After further recrystallization from acetone, the product is obtained as fine colorless needles having a melting point of 235–236.5° C.

To prepare the acetate from the acetone derivative, the product having a melting point of 220–235° C. is dissolved in about 20 parts by weight of absolute pyridine and approximately 15 parts by weight of acetic anhydride are added, after which the mixture is maintained at a temperature of about 60° C. for two hours. Thereafter, the solvent is evaporated in vacuo and the residue dissolved in ether, which solution is then washed with diluted hydrochloric acid, sodium carbonate solution and water, dried with sodium sulfate and evaporated. The product so obtained is crystallized from ether and yields about 1.5 parts by weight of the acetate derivative having a melting point of 205–217° C. Further recrystallization from acetone-ether yields the acetylated acetone derivative in the form of colorless rhombs and oblong hexagonal prisms which melt at 221–223° C. The specific rotation of the purified product is $[\alpha]\ 17 = +107.4 \pm 2°$ ($c = 2.01$ in acetone).

The trihydroxypropyl-17-monoacetate-20 derivative is prepared from the acetylated acetone compound by dissolving about 0.8 part by weight of the same in approximately 10 parts by weight of purified glacial acetic acid, adding about 8 parts by weight of water and maintaining the mixture at about 55° C. for 1½ hours. Thereafter, the solvent is removed completely by evaporating in vacuo at 50° C., and the amorphous residue obtained is dissolved in a small amount of acetone, after which an equal volume of ether is added, and the mixture permitted to crystallize. The crystals are removed by filtration with suction and are washed with acetone and ether. The yield of the trihydroxy-propyl-20-monoacetate compound is about 0.48 part and the product is characterized by a melting point of 198–205° C. A purified product suitable for analysis is obtained by recrystallization from acetone, yielding rods pointed at both ends which melt at 210–211.5° C. The average melting point of the unpurified material is 175–195° C.

$\Delta^4$-pregnene-3-one-17,20-diol-21-al-20 - monoacetate is prepared by dissolving about 0.3 part by weight of the described monoacetate in approximately 30 parts by weight of purified dioxane which has been freshly distilled over sodium, and a solution of about 0.34 part by weight of periodic acid in 6 parts water is added. After standing for about 16 hours at room temperature in an atmosphere of carbon dioxide, the solution is concentrated in vacuo at 30° C. bath temperature, after which about 30 parts of water are added and the concentration in vacuo repeated, causing precipitation of dissolved material which is then dissolved with agitation in freshly distilled ether. The ether extract so obtained is washed with water and potassium bicarbonate solution, dried with sodium sulphate and evaporated, yielding about 0.23 part by weight of crude product after crystallization from a mixture of acetone and ether. The crystalline product, after being washed with ether and pentane, melts at 201–204° C. Recrystallization of the product from an acetone-ether mixture yields woolly needles which melt with slight decomposition at 206–208° C. Additional quantities of the compound with M. P. of 202–205° C. can be obtained from the supernatant liquors derived from the recrystallization operations. The product, upon analysis, is found to possess a formula corresponding to $\Delta^4$-pregnene-3-one-17,20-diol-21-al-20-monoacetate. The product when dissolved in a little methanol reduces alkaline silver diamine solution at room temperature, although at a rate slightly less than does corticosterone and similar substances. An intense red color is obtained when the product is treated with 1,4-dioxynaphthalene, whereas this effect is not observed when desoxycorticosterone or its acetate are submitted to this treatment. A sample of the substance when wetted with concentrated sulphuric acid on a test plate yields a solution which is brownish-orange in color by transmitted light and which exhibits vivid greenish fluorescence when displayed against a black background. This new acetoxy aldehyde is the first known synthetic substance of adrenal cortical hormone type giving a positive reaction in this test.

Other esters, for instance the propionate, the butyrate or the benzoate can be prepared by analongous reactions.

The semicarbazone can be prepared by dissolving about 1 part by weight of the acetoxy-aldehyde in approximately 300 parts by weight of dioxan and boiling the solution for about two minutes with a solution of approximately 3 parts by weight of semicarbazide hydrochloride and 4.5 parts of sodiumacetate. A slight yellow coloration is produced although no solid precipitate is formed. The solution is filtered to remove suspended matter, highly concentrated in vacuo, and water is added, causing formation of a flocculent precipitate which is removed by filtration with suction. The product then is washed with water, dissolved in methanol, and again filtered after addition of water to the highly concentrated solution. The precipitate, which is in the form of a fine powder, is removed by filtration with suction, washed with water and ether, and dried in vacuo. When heated it becomes brownish in color at 190° C. and decomposes without melting.

The acetoxy aldehyde prepared as above described can be saponified by mixing with an aqueous or alcoholic potassium bicarbonate solution at room temperature thus yielding $\Delta^4$-pregnene-3-one-17,20-diol-21-al. Many of the compounds of the general type herein described contain one or more ring substituents such as hydrogen, acyloxy, alkoxyl, hydroxyl, and keto-oxygen groups. Such ring substituents may occupy the 3-position and/or other positions in one or more of the rings of the molecule. Any of these may be present in the starting compound and be carried through into the final product.

What I claim is:

1. Process for the manufacture of hydroxy-aldehydes of the saturated and unsaturated cyclopentanopolyhydrophenthrene-series and the esters thereof, which comprises condensing compounds of this series containing in 17-position a substituent of the formula

wherein R is a member of the group hydrogen and a hydrocarbon radical, with a carbonyl compound in the presence of an agent capable of splitting off water, condensation taking place between the carbonyl compound and hydroxyls at the positions 21 and 22, esterifying the hydroxyl at the position 20 by treating the condensation products with an esterifying agent, then regenerating the hydroxyls at the positions 21 and 22 by treating with an acid agent, and causing the resultant glycols to split into 20-ol-21-al esters.

2. Process for the manufacture of hydroxy-aldehydes of the saturated and unsaturated cyclopentanopolyhydrophenanthrene-series and the esters thereof, which comprises condensing compounds of this series containing in 17-position a substituent of the formula

wherein R is a member of the group hydrogen and a hydrocarbon radical, with a carbonyl compound in the presence of an agent capable of splitting off water, condensation taking place between the carbonyl compound and hydroxyls at the positions 21 and 22, esterifying the hydroxyl at the position 20 by treating the condensation products with an esterifying agent, then regenerating the hydroxyls at the positions 21 and 22 by treating with an acid agent, causing the resultant glycols to split into 20-ol-21-al esters, and treating these esters with a hydrolyzing agent.

3. Process for the manufacture of $\Delta^4$-pregnene-3-one-17,20-diol-21-al and the esters thereof, which comprises condensing 17-trioxypropyl-testosterone of the formula

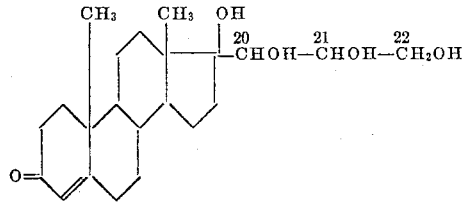

with a carbonyl compound in the presence of an agent capable of splitting off water, condensation taking place between the carbonyl compound and hydroxyls at the positions 21 and 22, esterifying the hydroxyl at the position 20 by treating the condensation products with an esterifying agent, then regenerating the hydroxyls at the positions 21 and 22 by treating with an acid agent, and causing the resultant glycols to split into $\Delta^4$-pregnene-3-one-17,20-diol-21-al esters.

4. Process for the manufacture of $\Delta^4$-pregnene-3-one-17,20-diol-21-al and the esters thereof, which comprises condensing 17-trioxypropyl-testosterone of the formula

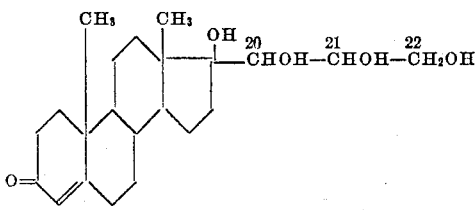

with a carbonyl compound in the presence of an agent capable of splitting off water, condensation taking place between the carbonyl compound and hydroxyls at the positions 21 and 22, esterifying the hydroxyl at the position 20 by treating the condensation products with an esterifying agent, then regenerating the hydroxyls at the positions 21 and 22 by treating with an acid agent, causing the resultant glycols to split into $\Delta^4$-pregnene-3-one-17,20-diol-21-al esters, and treating these esters with a hydrolyzing agent.

5. Process for the manufacture of $\Delta^4$-pregnene-3-one-17,20-diol-21-al and the esters thereof, which comprises condensing 17-trioxypropyl-testosterone of the formula

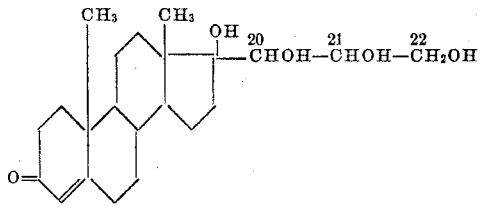

with a ketone in the presence of an agent capable of splitting off water, condensation taking place between the carbonyl compound and hydroxyls at the positions 21 and 22, esterifying the hydroxyl at the position 20 by treating the condensation products with an esterifying agent, then regenerating the hydroxyls at the positions 21 and 22 by treating with an acid agent, causing the resultant glycols to split into $\Delta^4$-pregnene-3-one-17,20-diol-21-al esters with periodic acid, and treating these esters with a hydrolyzing agent.

TADEUS REICHSTEIN.